United States Patent
Hiramitsu et al.

[11] Patent Number: 5,330,223
[45] Date of Patent: Jul. 19, 1994

[54] AIR BAG COVER HAVING REINFORCING RIBS

[75] Inventors: Tetsushi Hiramitsu; Michio Inoue; Akihiko Sonobe; Tadashi Yamamoto; Hiroshi Ogawa; Takanobu Ikeda, all of Aichi, Japan

[73] Assignee: Toyoda Gosei Co., Ltd., Nishikasugai, Japan

[21] Appl. No.: 91,263

[22] Filed: Jul. 15, 1993

[30] Foreign Application Priority Data

| Oct. 29, 1992 | [JP] | Japan | 4-075358[U] |
| Oct. 29, 1992 | [JP] | Japan | 4-291653 |
| Oct. 29, 1992 | [JP] | Japan | 4-291666 |
| Oct. 30, 1992 | [JP] | Japan | 4-293490 |

[51] Int. Cl.$^5$ ............................................. B60R 21/20
[52] U.S. Cl. ............................ 280/728 A; 280/728 B
[58] Field of Search ............ 280/728 B, 728 A, 728 R, 280/731, 732

[56] References Cited

U.S. PATENT DOCUMENTS

| 4,148,503 | 4/1979 | Shiratori et al. | 280/728 B |
| 5,069,477 | 12/1991 | Shiraki | 280/728 B |
| 5,110,647 | 5/1992 | Sawada et al. | 280/728 B |
| 5,152,548 | 10/1992 | Zushi | 280/728 B |

FOREIGN PATENT DOCUMENTS

| 63-189956 | 12/1988 | Japan . | |
| 0241856 | 9/1990 | Japan | 280/728 B |
| 3189252 | 8/1991 | Japan . | |
| 0427639 | 1/1992 | Japan . | |
| 4055147 | 2/1992 | Japan | 280/728 A |
| 0470557 | 6/1992 | Japan . | |
| 2244961 | 12/1991 | United Kingdom | 280/728 B |

Primary Examiner—Margaret A. Focarino
Assistant Examiner—Peter English
Attorney, Agent, or Firm—Cushman, Darby & Cushman

[57] ABSTRACT

A pad for an air bag apparatus is provided which assures that a part of the pad between a breakage portion and a side wall portion is not scattered away in pieces when the air bag expands. The pad includes an upper wall portion and side wall portions extending downward from the periphery of the upper wall portion. Cover portions adapted to be opened upon breakage of a breakage portion at the time of expansion of the air bag are formed over the upper wall portion. A predetermined number of vertically extending triangular plate-shaped ribs are integrally molded with the upper wall portion and the side wall portions along the periphery of the breakage portion and extend from the side wall portions to the breakage portion.

10 Claims, 6 Drawing Sheets

AIR BAG COVER HAVING REINFORCING RIBS

This application incorporates by reference the priority application, Japanese patent application No. 4-291653 filed Oct. 29, 1992.

BACKGROUND OF THE INVENTION

The present invention relates to a molded synthetic resin pad for an air bag apparatus arranged on an instrument panel or the like located within a steering wheel or in front of the passenger's seat of an automobile.

A conventional pad of the foregoing type for an air bag apparatus includes as essential components an upper wall portion for surrounding the periphery of an air bag, and a side wall portion extending downward from the periphery of the upper wall portion. The upper wall portion includes cover portions adapted to be opened upon breakage of a breakage portion at the time of expansion of the air bag.

An example of the breakage portion as mentioned above is disclosed in an official gazette of Japanese Utility Model Laid-Open Publication No. 63-189956. According to the conventional device, the breakage portion usually includes two center line portions formed at the central part of an upper wall portion of a pad while extending in the leftward/rightward direction and two side line portions extending from the opposite ends of the center line portions at a right angle relative to the center line portions, as seen from above.

With the pad constructed in the above-described manner, two cover portions, with the central line portions of the prospective breakage portion defined by the left-hand and right-hand side line portions located therebetween, are opened at the time of expansion of an air bag.

Since the conventional pad is constructed in the above-described manner, when a considerably long distance exists between the side line portions of the breakage portion and the side wall portion below the lower surface of the pad, there is a possibility that a part of the pad located between the breakage portion and the side wall portion will scatter away in pieces as the cover portions are opened upon breakage of the breakage portion when the air bag is expanded.

The present invention has been made in consideration of the foregoing background and its object resides in providing a pad for an air bag apparatus which prevents the malfunction that a part of the pad located between a breakage portion and a side wall portion will scatter away in pieces when the air bag is expanded.

SUMMARY OF THE INVENTION

To accomplish the above object, the present invention provides a molded synthetic resin pad for an air bag apparatus including an upper wall portion for surrounding the periphery of an air bag therewith and a side wall portion extending downward from the periphery of the upper wall portion. The upper wall portion includes cover portions adapted to be opened upon breakage of a breakage portion when the air bag expands. The pad is characterized in that a predetermined number of vertically extending triangular plate-shaped ribs are molded integrally with the upper wall portion and the side wall portion along the periphery of the breakage portion while extending from the side wall portion to the breakage portion below the lower surface of the upper wall portion.

With this construction, since a part of the pad between the breakage portion and the side wall portion is connected to the side wall portion with the triangular plate-shaped ribs interposed therebetween, an occurrence of a malfunction that a part of the pad between the breakage portion and the side wall portion will scatter away in pieces as the cover portions are opened when the air bag is expanded, can be prevented.

Thus, as the air bag is expanded, the expansion is properly guided with the aid of the triangular plate-shaped ribs, resulting in the expanding force of the air bag being smoothly exerted on the breakage portion. Consequently, the breakage portion can be broken without failure.

In such manner, the pad constructed according to the present invention assures that an occurrence of the above-mentioned malfunction can be prevented, and moreover, the breakage portion can be reliably broken.

DETAILED DESCRIPTION OF THE PRESENTLY PREFERRED EXEMPLARY EMBODIMENTS

The present invention will now be described in detail hereinafter with reference to the accompanying drawings.

Figure 1:
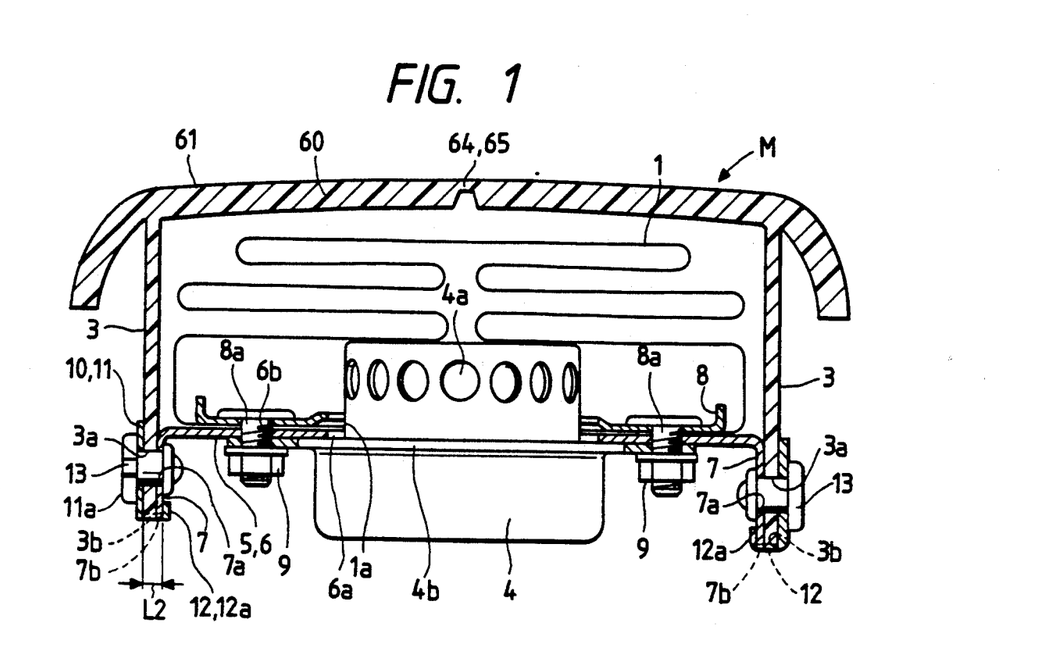
FIG. 1 is a sectional view of a pad for an air bag apparatus constructed according to an embodiment of the present invention, taken along line I—I in FIG. 4.

As shown in FIG. 1, according to the embodiment of the present invention, an air bag apparatus M includes an air bag 1 held in the flattened, non-inflated state, a pad 60 surrounding the periphery of the air bag 1, an inflator 4 for feeding gas so as to expand the air bag 1 therewith, and a bag holder 5 for holding the air bag 1, the pad 60 and the inflator 4 in a steering wheel.

In this embodiment, as shown in FIG. 1 to FIG. 5, the pad 60 is composed of an upper wall portion 61 having a periphery that is downwardly bent and a side wall portion 3 that extends downward from the lower surface of the upper wall portion 61 while exhibiting the substantially rectangular column-shaped configuration. The wall portions 61 and 3 are integrally molded of a synthetic resin such as a polyethylene based thermoplastic elastomer, a polystyrene based thermoplastic elastomer or the like by employing an injection molding process.

Figure 4:
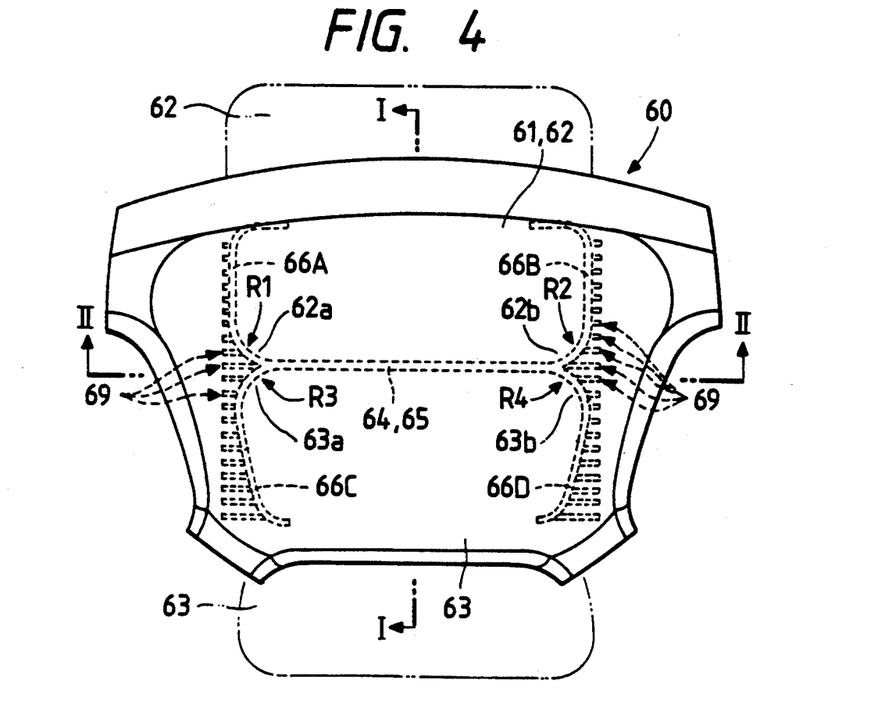
FIG. 4 is a plan view of the pad shown in FIG. 1 as seen from above.

To assure that the upper wall portion 61 is broken without fail when the air bag 1 is expanded, a breakage portion 64 having a reduced thickness is formed at the substantially central part of the upper wall portion 61 while extending over the substantially entire area of the upper wall portion 61. The breakage portion 64 is composed of a center line portion 65 and four side line portions 66 extending from the opposite ends of the central line portion 65 in the bent state. Thus, the breakage portion 64 exhibits a substantially H-shaped contour as seen from above.

Parts each defined by the central line portion 65 and the side line portions 66 become cover portions 62 and 63 which are forcibly opened when the air bag 1 is expanded, similar to opening a folding door.

Figure 2:
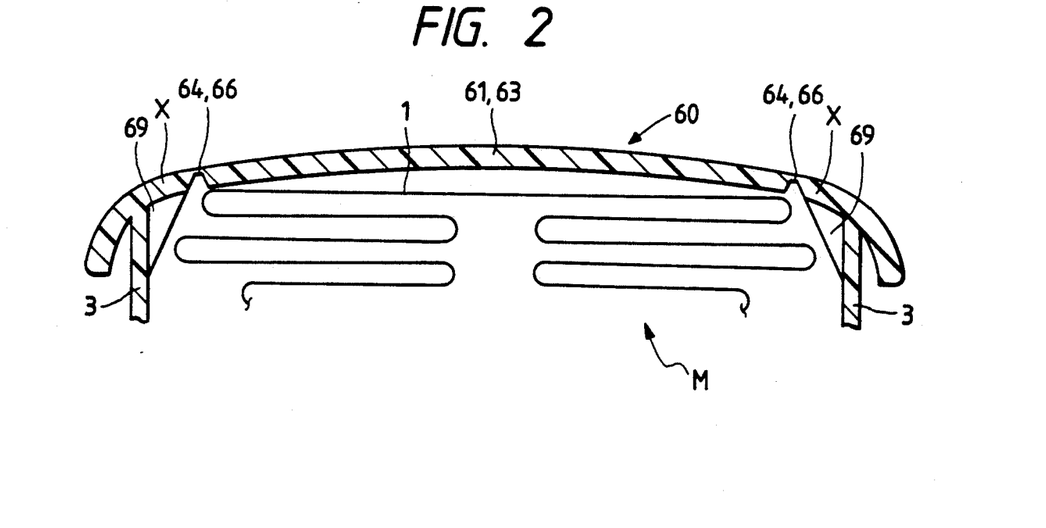
FIG. 2 is a sectional view of a pad for an air bag apparatus taken along line II—II in FIG. 4.
Figure 3:
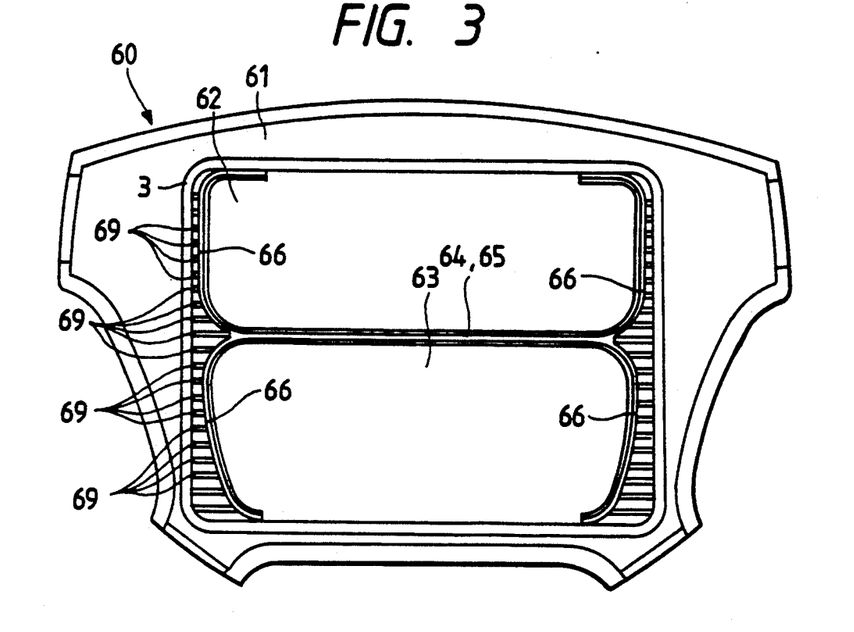
FIG. 3 is a plan view of the pad shown in FIG. 1 as seen from below.

With the pad 60 constructed according to the embodiment of the present invention, a predetermined number of vertically extending triangular plate-shaped ribs 69 each extending from the side wall portion 3 to the side line portion 66 are formed integral with the upper wall portion 61 and the side wall portion 3 along the side line portion 66, in a substantially equally spaced relationship as will be best seen in FIGS. 2–4.

With the pad 60 constructed according to the embodiment of the present invention, when the folded air bag 1 is expanded in case of emergency, breakage takes place along the central line portion 65 and the side line portions 66 constituting the breakage portion 64, whereby the cover portions 62 and 63 are widely opened, causing the air bag to expand greatly through the opened portion which is formed over the upper wall portion 61.

At this time, since the side line portions 66 are connected to the side wall portion 3 with the triangular plate-shaped ribs 69 interposed therebetween in the region X, a malfunction that the region X between the side line portions 66 and the side wall portion 3 will scatter away in pieces when the breakage line portion 64 is broken at the time of large expansion of the air bag 1, causing the cover portions 62 and 63 to be widely opened does not occur.

At the time of expansion of the air bag 1, the air bag 1 is largely expanded with the aid of the triangular plate-shaped ribs 69, whereby the expansion force induced as the air bag 1 is expanded can be conducted smoothly to the breakage portion 64. In such manner, the breakage portion 64 can be reliably broken.

Due to the necessity for adding shape retainability to the pad 60 designed in the form of a pad composed of a single layer, the pad 60, constructed according to the embodiment of the present invention, is molded of a thermoplastic elastomer (hereinafter referred to simply as TPE) of which bending elastic modulus at a room temperature is within the range of 500 to 3200 Kgf/cm². Although any type of TPE may be employed for molding the pad 60, provided that it exhibits the bending elastic modulus within the foregoing range, it can be exemplified by a polystyrene based TPE, a polyester based TPE or the like.

Among the polystyrene based TPEs, SBS based TPE of which a soft segment is composed of a polybutadiene, SIS based TPE of which a soft segment is composed of a polyisoprene and SEBS based TPE of which a soft segment is composed of a polyorefin can practically be used as a material for molding the pad 60. Among these materials, SEBS is preferably used as a material for the pad 60, because it does not contain a double bond between molecules but exhibits excellent weather resistance, wear resistance and heat resistance. For example, "Toughtec" manufactured by Asahi Kasei K. K. can be used as the material for the pad 60.

The following types of polyester based TPE can be noted as employable materials. (1) Polyester-polyether type of TPE of which a hard segment is composed of polyester such as polybutylene terephtalate or the like and of which a soft segment is composed of polyether such as polytetra-methylene-glycolether (PTMG) or PTMEGT (condensation product of PTMG and terephthalic acid), (2) polyester-polyester type of TPE of which a hard segment is composed of polyester and of which a soft segment is composed of fatic acid polyester such as polycaproraktone or the like. For example, "Rohmod" General Electric and "Hightoreru" manufactured by Dupont can be used as materials for the pad 60.

As noted above, the breakage portion 64 having a small thickness so as to allow it to be broken on expansion of an air bag 1 is formed over the central part of the upper wall portion 61. The breakage portion 64 is composed of a center line portion 65 and four side line portions 66 (66A, 66B, 66C, 66D) extending from the opposite ends of the center line portion 65 in substantially H-shaped contour when the pad 60 is visually observed from above.

A part of the pad 60 surroundingly defined by the center line portion 65 and the side line portions 66 forms cover portions 62 and 63 adapted to be opened like a folding door upon expansion of the air bag 1.

Parts 62a, 62b, 63a and 63b of the cover portions 62 and 63 located in the vicinity of intersections defined by the center line portion 65 and the side line portions 66 are configured in the form of a curved line having a radius R (R1, R2, R3, R4) of approximately 2 to 20 mm. In the illustrated embodiment, the radius R is set to approximately 5 mm.

With the pad 60 constructed according to the embodiment of the present invention, when the air bag is expanded due to a vehicle collision or the like, breakage takes place along the center line portion 65 and the side line portions 66 of the breakage portion 64, causing the air bag 1 to outwardly extend through the opened part of the upper wall portion 61 in the expanded state.

At this time, since the parts 62a, 62b, 63a and 63b of the cover portions 62 and 63 are contoured in the form of a curved line having a predetermined radius, and moreover, since the material of the pad 60 itself has a predetermined bending elastic modulus so as to allow the foregoing parts 62a, 62b, 63a and 63b to be kept soft, a malfunction that these curved parts may be unpleasantly felt by a driver at the time of vehicle collision or the like is prevented.

With the pad 60 constructed according to the embodiment of the present invention, the breakage portion 64 is designed in the substantially H-shaped configuration as seen from above. Alternatively, the breakage portion 64 may be designed in the substantially H-shaped configuration turnably displaced from the first-mentioned configuration by an angle of 90 degrees as seen from above. Further, the breakage portion 64 may be designed in the substantially U-shaped configuration as seen from above. In this case, the breakage portion 64 is designed in the substantially U-shaped configuration with the side line portions 66C and 66D removed from the configuration of the pad 60 constructed according to the embodiment of the present invention.

As shown in FIG. 1, the periphery of a lower circular opening 1a of the air bag 1 is retained by an annular retainer 8 preferably made of a sheet of metallic material and integrated with a plurality of bolts 8a so that the air bag 1 is mounted on the bag holder 5 by tightening nuts 9 threadably fitted onto the bolts 8a which extend through the bag holder 5.

Since the bolts 8a integrated with the retainer 8 also extend through a flange portion 4b of the inflator 4 so as to allow them to threadably engaged with the nuts 9, the inflator 4 is also held by the bag holder 8.

Figure 5:
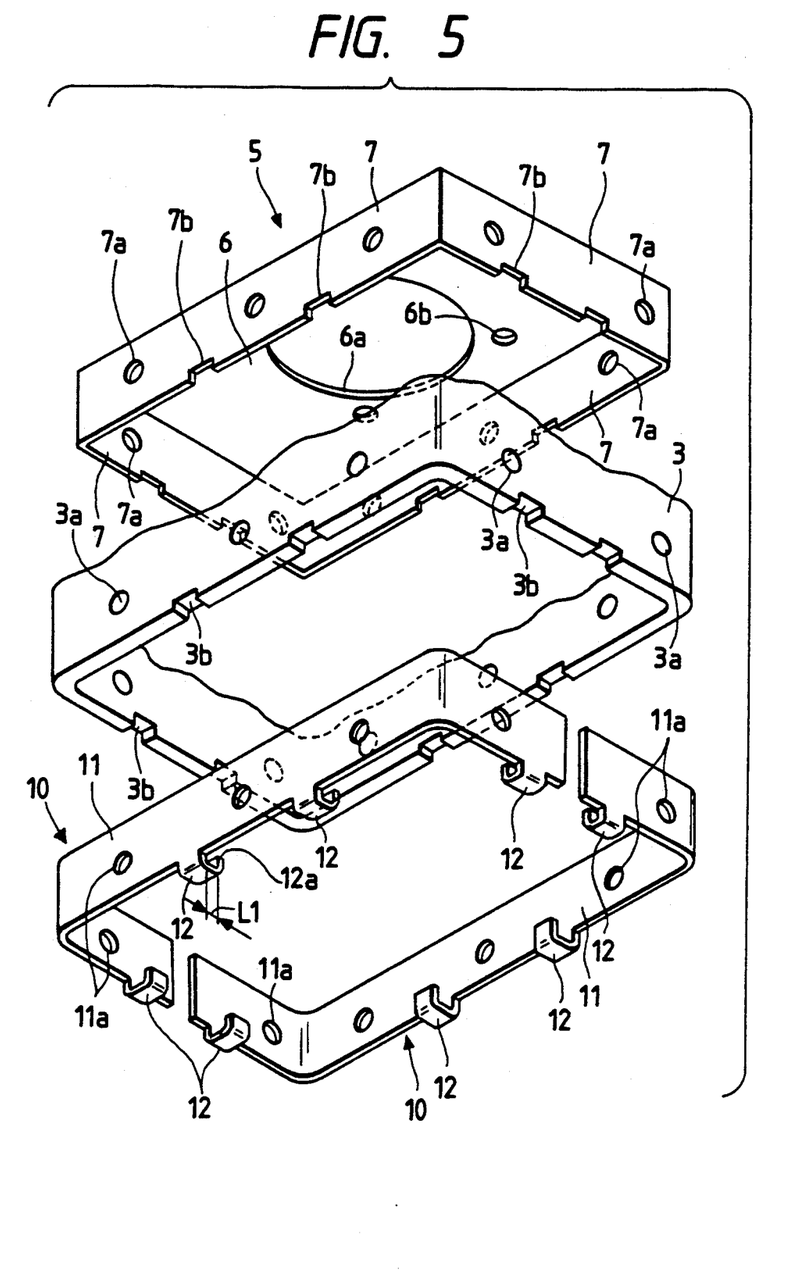
FIG. 5 is a perspective view of the air bag apparatus, particularly showing a securing member, side walls of a bag holder and an abutment plate, in the disassembled state.

The bag holder 5 is preferably made of a sheet of metallic material, and as shown in FIG. 1 and FIG. 5, the bag holder 5 has a rectangular bottom wall 6 and four side walls 7 each extending downward from the periphery of the bottom wall 6.

An insert hole 6a is formed at the central part of the bottom wall 6 so that the upper side of the inflator 4 having a plurality of outlet ports 4a formed thereon is inserted through the insert hole 6a. It should be noted that another fixing means such as nuts or the like (not shown) are arranged on the bottom wall 6 so as to allow the air bag apparatus M to be mounted on a steering wheel.

A plurality of fitting holes 7a are formed at predetermined positions on the side walls 7 of the bag holder 5 so that the pad 60 is fixedly secured to the side walls 7 of the bag holder 5 by means of rivets 13 inserted through the fitting holes 7a, serving as fixing means. A predetermined number of recesses 7b are formed along the lower end of each side wall 7 of the bag holder 5. A plurality of pawl portions 12 of an abutment plate 10, to be described later, are engageably fitted into the recesses 7b.

As shown in FIG. 1 and FIG. 5, the pad is molded from a synthetic resin, the rectangular column-shaped securing side wall portion 3 is molded integrally with the pad 60 on the lower surface thereof. A predetermined number of fitting holes 3a are formed through the side wall portion 3 so that rivets 13 are inserted through the fitting holes 3a. A plurality of recesses 3b are also formed along the lower end of the side wall portion 3 at the predetermined positions corresponding to the recesses 7b so as to allow the pawl portions 12 of the abutment plate 10 to be engageably fitted into the recesses 3b.

The abutment plate 10 for fixedly securing the side wall portion 3 to the side walls 7 of the bag holder 5 is preferably made of a sheet of metallic material. In the illustrated embodiment, the abutment plate 10 is divided into two halves each having a U-shaped contour as seen from above so that the outer peripheral surface of the rectangular column-shaped side wall portion 3 is covered with both halves of the abutment plate 10.

A plurality of fitting holes 11a are formed through a U-shaped main body 11 of the abutment plate 10 at predetermined positions on the main body 11, and a plurality of pawl portions 12 each inwardly projected and then upwardly bent are formed along the lower end of the main body 11.

A distance L1 of each pawl portion 12, as measured from the main body 11 to a hook 12a located at the foremost end of the pawl portion 12, is substantially equalized to a thickness dimension L2 between the securing portion 3 and the side wall 7 of the bag holder 5.

To assure that the respective fitting holes 3a, 7a and 11a formed through the side wall portion 3, the side walls 7 of the bag holder 5 and the abutment plate 10 are correctly aligned relative to these components when the pawl members 12 are fitted into the corresponding recesses 3b and 7b, it is essential that the pawl portions 12 and the recesses 3b and 7b are correctly formed at the predetermined positions on the side wall portion 3 and the side walls 7 of the bag holder 5.

Next, description will be made below with respect to an assembling operation to be performed for the air bag apparatus M constructed according to the embodiment of the present invention. First, the retainer 8 is placed around the inner periphery of the opening 1a of the air bag 1, and the air bag 1 is then folded in the flattened, deflated state.

The air bag 1 and the inflator 4 are immovably mounted on the bag holder 5 by tightening the nuts 9 threadably fitted onto the bolts 8a integrated with the retainer 8.

Subsequently, the side wall portion 3 of the pad 60 is placed around the side walls 7 of the bag holder 5, and the abutment plate 10 is then brought in contact with the outer peripheral surface of the side wall portion 3. At this time, the pawl portions 12 extending inwardly of the abutment plate 10 are engageably fitted into the recesses 3b and 7b of the side wall portion 3 and the side walls 7 of the bag holder 5. Consequently, the fitting holes 3a, 7a and 11a formed through the side wall portion 3, the side walls 7 of the bag holder 5 and the abutment plate 10 are correctly aligned relative to each other.

Now, the side wall portion 3 of the pad 60 can be secured to the side walls 7 of the bag holder 5 by inserting rivets 13 through the respective fitting holes 3a, 7a and 11a.

Subsequently, the air bag apparatus M can be fastened to the steering wheel by utilizing fixing means (not shown) disposed on the bag holder 5.

Since it is only required that the main body 11 of the abutment plate 10 be brought in contact with the surface of the side wall portion 3 with the exception of the pawl portions 12, there does not arise any particular necessity for bending the abutment plate 10 in the direction of inward extension of the pawl portions 12, but it is merely required that each pawl portion 12 be bent to exhibit a U-shaped, sectional shape. Thus, the abutment plate 10 can be produced by performing an easy bending operation.

The recesses 3b in the side wall portion 3 can be formed by recessing a portion at the lower end thereof. Moreover, there is no need of forming an undercut part in an injection molding die required for molding the pad 60. Thus, the upper wall portion 61 of pad 60 can easily be molded together with the side wall portion 3.

Similarly, the recesses 7b on the side walls 7 of the bag holder 5 can be formed by recessing a part of each side wall 7 of the bag holder 5 at the lower end thereof. Specifically, the insert hole 6a and the fitting holes 7a are preliminarily formed through a sheet of metallic material for the bag holder 5, and the recesses 7b are preliminarily formed at the predetermined position on the sheet of metallic material. Subsequently, the sheet of metallic material is subjected to bending usually employed for forming the side walls 7 of the bag holder 5. Thus, the bag holder 5 can easily be produced using a sheet of metallic material with the result that the bag holder 5 can easily be produced together with the side walls 7.

With the air bag apparatus M constructed according to the embodiment of the present invention, the side wall portion 3 of the pad 60 is fixedly secured to the side walls 7 of the bag holder 5 while it is immovably clamped between the abutment plate 10 and the side walls 7 of the bag holder 5 with the aid of rivets 13 inserted through the respective fitting holes 3a, 7a and 11a formed through the side wall portion 3, the side walls 7 of the bag holder 5 and the abutment plate 10. Moreover, the positions of the respective fitting holes 3a, 7a and 11a can easily be determined relative to these components while reducing production costs and man-hours required for producing the pad 60, the bag holder 5 and the abutment plate 10. Thus, an assembling operation for the air bag apparatus M can be performed at a high efficiency.

In the aforementioned embodiment, since the positions assumed by the pawl portions 12 of the abutment plate 10 are offset from the respective fitting holes 3a, 7a and 11a in the vertical direction without a possibility that they interfere with the rivets 13, a tightening operation for the rivets 13 can be achieved without any particular problem.

In addition, in the illustrated embodiment, each pawl portion 12 on the abutment plate 10 is designed to include a hook 12a formed by bending the foremost end of the pawl portion 12 in the upward direction. Alternatively, the pawl portion 12 may be designed in another manner, having no hook, provided that the pawl portions 12 can engageably be fitted into the corresponding recess 7b formed on the side walls 7 of the bag holder 5 so that the respective fitting holes 3a, 7a and 11a can be located correctly relative to the side wall portion 3, the side walls 7 of the bag holder 5 and the abutment plate 10.

In case that the distance L1 of each pawl portion 12 as measured from the main body 11 to the hook 12a is dimensioned to be appreciably less than the thickness dimension L2 between the side wall portion 3 and the side walls 7 of the bag holder 5, the pawl portion 12 is forcibly fitted to the side wall portion 3 and the side walls 7 of the bag holder 5 from the outside when the abutment plate 10 is attached to the side wall portion 3, resulting in the abutment plate 10 being held on the side wall portion 3 side without an occurrence of disconnection of the abutment plate 10 from the side wall portion 3.

Thus, inserting and hammering operations can easily be achieved with each of the rivets 13.

In the illustrated embodiment, the abutment plate 10 is divided into two halves each serving to cover the periphery of the rectangular column-shaped side wall portion 3 therewith. Alternatively, the abutment plate 10 may be divided into four flat plate-shaped segments each serving to cover one flat plane portion of the side wall portion 3 while having a plurality of pawl portions formed thereon.

When the abutment plate 10 is designed to include four portions each serving to cover a corner portion of the side wall portion 3 according to the embodiment of the present invention, each corner portion of the side wall portion 3, molded of a synthetic resin, is reinforced with the foregoing portions of the abutment plate 10. In addition, since the abutment plate 10 is brought in engagement with the respective corner portions of the side wall portion 3, a locating operation can easily be achieved for the respective fitting holes 3a, 7a and 11a.

In the illustrated embodiment, rivets 13 are employed as fixing means for fixing the side wall portion 3 to the side walls 7 of the bag holder 5. Alternatively, a combination of bolts and nuts may be employed in place of the rivets 13.

Figure 7:
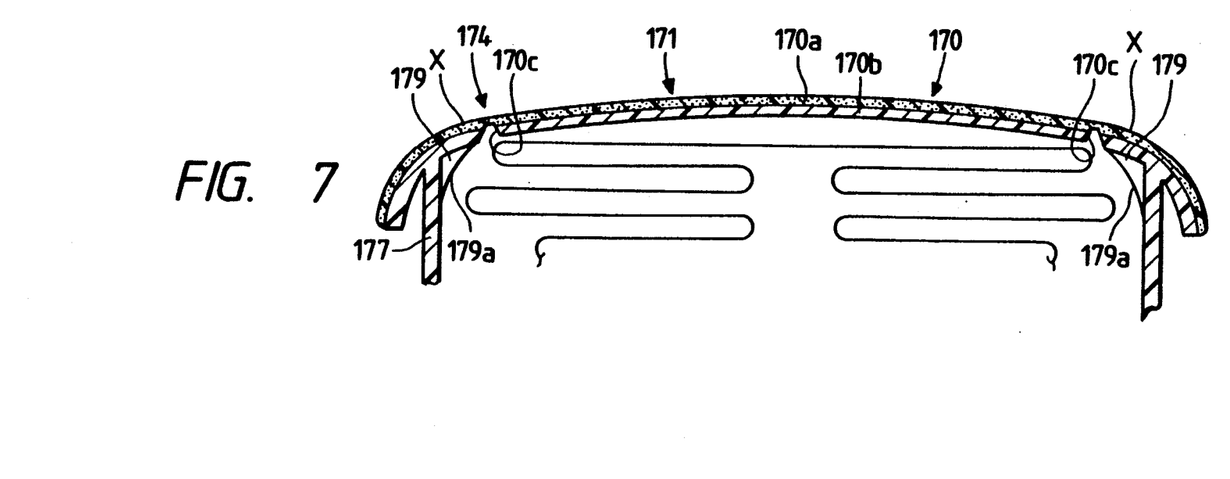
FIG. 7 is a sectional view of a pad for an air bag apparatus taken along line VII—VII in FIG. 8.

The pad 60 constructed according to the embodiment of the present invention has been described above with respect to case that it is designed in the form of a pad composed of a single layer. However, the present invention should not be limited only to the pad 60 composed of a single layer. Alternatively, the present invention may equally be applied to a pad 170 of the double layer type consisting of a sheath layer 170a and a core layer 170b, as shown in FIG. 7.

The pad 170 is produced in such a manner that the sheath layer 170a is molded with the preliminarily molded core layer 170b as an insert. The sheath layer 170a is molded of a synthetic resin such as a polystyrene based thermoplastic elastomer, a polyorefin based thermoplastic elastomer or the like which is softer than the synthetic resin employed for the pad 60. The core layer 170b is molded of a synthetic resin such as a polyester based thermoplastic elastomer, a polyurethane based thermoplastic elastomer or the like having an improved shape retainability property as compound with the synthetic resin employed for the sheath layer 170a.

The pad 170 includes an upper wall portion 171 and a side wall portion 177 each configured in the same manner as the pad 60, and a substantially H-shaped breakage portion 174 is formed over the upper wall portion 171.

The breakage portion 174 is formed such that a thickness on the sheath layer 170a at the breakage portion 174 is dimensioned to be substantially equal to or less than the thickness of the remaining sheath layer 170a, while a thickness on the core layer 170b at the breakage portion 174 is dimensioned to be less than the thickness of the remaining core layer 170b or the core layer 170b is partially perforated to form a brittle portion 170c.

A predetermined number of triangular plate-shaped ribs 179 are molded integrally with the core layer 170b of the pad 170 so that the same functional effects as those of the pad 60 can be obtained with the pad 170 when the air bag 101 is expanded.

An oblique side 179a of each of the triangular plate-shaped ribs 179 formed on the pad 170 is designed in the form of a concave arch. With this construction, since an inner receiving space of the pad 170 for receiving the air bag 101 therein can be enlarged, a problem upon expansion of the side wall portion 177 in the outward direction due to folding of the air bag 101 can be eliminated, and moreover, undesirable deterioration of the aesthetic properties of the pad 170 can be prevented. In addition, since the air bag 101 can smoothly be introduced into the upper wall portion 171 via the side wall portion 177, smooth expansion of the folded air bag 101 can be realized.

In addition to the two layer type pad 170 as described above, the technical concept that a plurality of triangular plate-shaped ribs 179 are formed on the core layer 170b can equally be applied to another type of pad which is constructed such that a sheath layer 170a and a core layer 170b are separately molded, and thereafter, the core layer 170b is covered with the sheath layer 170a.

Figure 6:
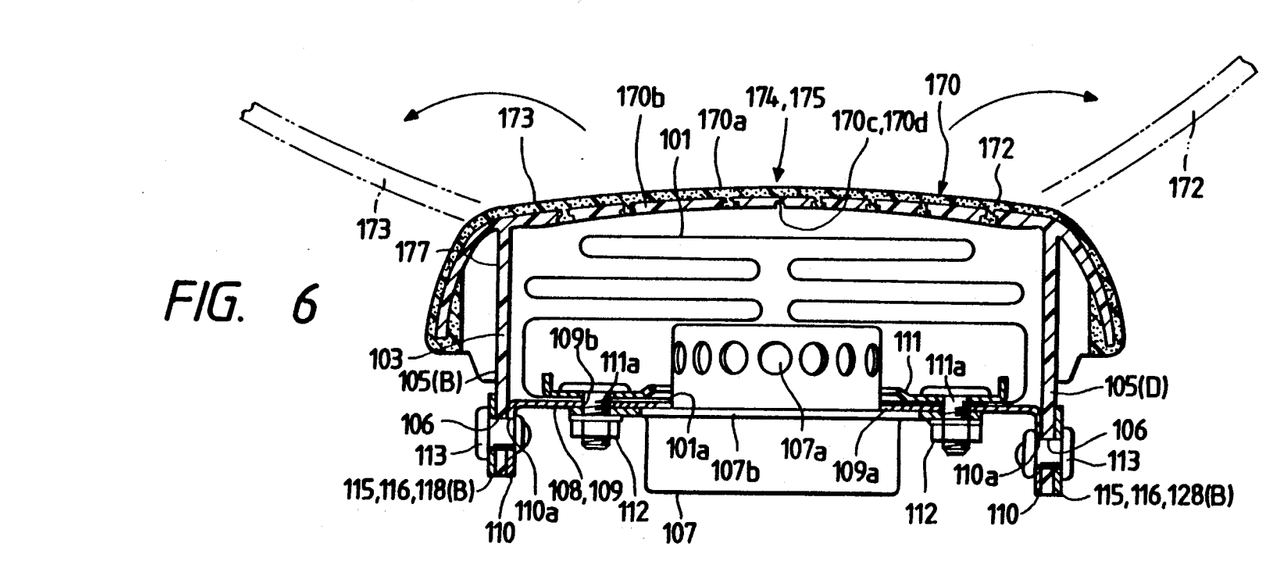
FIG. 6 is a sectional view of a pad for an air bag apparatus constructed according to another embodiment of the present invention, taken along line VI—VI in FIG. 8.
Figure 8:
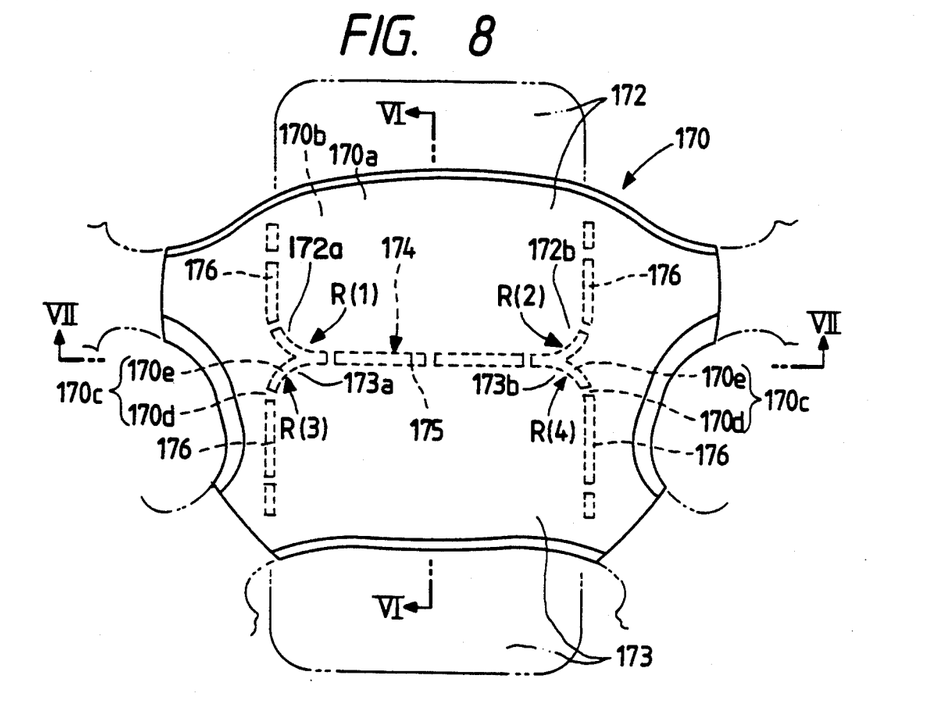
FIG. 8 is a plan view of the pad shown in FIG. 6 as seen from above.

In the illustrated embodiment, the pad is designed in the form of a pad 60 composed of a single layer. Alternatively, the present invention can equally be applied to an other embodiment wherein a pad 170 is designed in the form of a pad composed of a double layer consisting of a sheath layer 170a and a core layer 170b each molded by employing an injection molding process as shown in FIG. 6 and FIG. 8.

In this embodiment, since the core layer 170b is covered with the sheath layer 170a, it is recommended that a material used for the sheath layer 170a be softer than that used for the core layer 170b (with a bending elastic modulus of 50 to 400 Kgf/cm$^2$). For example, a polystyrene based TPE and a polyorefin based TPE can be used as a material for the sheath layer 170a.

The polystyrene based TPE can be exemplified by a SBS based TPE of which a soft segment is composed of polypropylene, a SIS based TPE of which a soft segment is composed of polyisoprene and a SEBS based TPE of which a soft segment is composed of polyorefin. Among these materials, SEBS based TPE is preferably used as a material for the sheath layer 170a because it does not have a double bond between molecules but exhibits excellent weather resistance, wear resistance and heat resistance. For example, "Labalon SJ5400B and SJ6400B" manufactured by Mitsubishi Yuka K. K. and "crayton G1657" manufactured by Shell Chemical Co. can be used as materials for the sheath layer 170a.

The polyorefin based TPE can be exemplified by a blend type TPE, a polymerized type TPE, a composite type TPE composed of the first-mentioned TPEs of which part is cross-linked in the presence of an certain organic peroxide, and a dynamically vulcanized type TPE of which a rubber layer is completely cross-linked during a kneading operation. Particularly, among these materials, the dynamically vulcanized type TPE is preferably used because it exhibits excellent heat resistance and wear resistance. For example, "Mistramer 5030N" manufactured by Mitsui Sekiyu Kagaku K. K. and "Thermoran 3550B" manufactured by Mitsubishi Yuka K. K. can be used as materials for the sheath layer 170a.

The breakage portion 174 of the pad 170 is formed such that a thickness on the sheath layer 170a at the breakage portion 174 is dimensioned to be substantially equal to or less than the thickness of the remaining sheath layer 170a, while a thickness on the core layer 170b at the breakage portion 174 is dimensioned to be less than the thickness of the remaining core layer 170b, or the core layer 170b is partially perforated to form a brittle portion 170c.

Parts 172a, 172b, 173a and 173b of the cover portion 172, 173 located in the vicinity of the intersections defined by the center line portion 175 and the side line portions 176 of the breakage portion 174 are designed in the form of a curved line having a radius R (R1, R2, R3, R4) of 2 to 20 mm in the same manner as the pad 60.

The core layer 170b is molded of a material preferably having a bending elastic modulus of 1500 to 4000 Kgf/cm$^2$. The core layer 170b is formed according to either of the following two processes. According to one of the two processes, the brittle portion 170c, located in the vicinity of the part 172a, 172b, 173a, 173b on the cover portion 172, 173, is continuously connected to the surrounding part (a plurality of joint portions 170d are formed when the brittle portion 170c is formed by a continuous thin wall portion or it is formed by slits or the like). According to the other process, the brittle portion 170c is connected to the surrounding part (a plurality of holes 170c are formed when the brittle portion 170c is formed by slits or the like). Due to the fact that the parts 172a, 172b, 173a and 173b are felt by a driver when the cover portions 172 and 173 are opened upon expansion of the air bag 101 due to occurrence of breakage along the breakage portion 174, problems are not created since the material used for molding the core layer 170b exhibits a high bending elastic modulus.

The material used for the core layer 170b can be exemplified by a polyester based TPE and a polyurethane based TPE.

When the core layer 170b is molded from a polyester based TPE or a polyurethane based TPE, the strength (especially, tensile/tearing strength) required for the core layer 170b can easily be obtained although each of the foregoing materials exhibits a low bending elastic modulus. In addition, since each of the foregoing materials has a softening temperature higher than 100° C., shape retainability at an elevated temperature can easily be given to these materials. Moreover, each of these materials is a polar material, assuring that a transition of a hydrocarbon based softening agent (non-polar material) from the sheath layer 170a is not promotively achieved with each of these materials.

The polyester based TPE is exemplified by the following two materials. (1) Polyester-polyether type of which a hard segment is composed of polyester such as polybutylene-terephthalate or the like and of which a soft segment is composed of polyether such as polytetramethylene-glycol-ether (PTMG), PTMEGT (condensation product composed of PTMG and terephthalic acid), (2) Polyester-polyester type of which a hard segment is composed of polyester and of which soft segment is composed of fatic polyester such as polycaprolactone or the like. For example, "Hightrel 5557 and 5577" manufactured by Torei K. K. and Dupont and "Pruplene S-2001 and S-3001" manufactured by Toyo Boseki K. K. can be used as materials for the core layer 170b.

The polyurethane based TPE is exemplified by the hollowing four materials which are classified depending on long-chained polyol to be used. (1) Caprolactone based TPE, (2) Adipate based TPE, 3) Polycarbonate based TPE, (4) Polyester based TPE. Among these materials, the caprolactone based TPE having a high mechanical strength while exhibiting excellent heat/aging resistance and cold weather proofness in the well-balanced state is preferably used. For example, "Pandex T-5070 and T-5965D" manufactured by Dainippon Ink K. K. and "Estran F-574FNAT" manufactured by Nippon Estran K. K. can be used as materials for the core layer 170b. Generally, the polyurethane bases material has a bending elastic modulus in excess of 2500 Kgf/cm$^2$. For this reason, it is desirable that the bending elastic modulus of the polyurethane based material is adjusted to be less than the foregoing value as desired by adding a plasticizer to the polyurethane based material.

In practice, the pad 170 is produced by way of the steps of molding the core layer 170b and then molding the sheath layer 170a with the core layer 170b as an insert, by employing an injection molding process so that both the layers 170a and 170b are integrated with each other. It is recommended that the core layer 170b is preliminarily coated with an adhesive before the sheath layer 170a is molded on the core layer 170b by employing the injection molding process.

Also, with respect to the pad 170 constructed according to the embodiment of the present invention, since the parts 172a, 172b, 173a and 173b on the cover portions 172, 173 are formed in the form of a curved line having a predetermined radius and the sheath layer 170a has a bending elastic modulus within the predetermined range, it is assured that the pad 170 offers the same advantageous effects as those of the pad 60.

As shown in FIG. 6, according to the another embodiment of the present invention, an air bag apparatus M includes an air bag 101 held in the flattened, deflated state, a pad 170 surrounding the periphery of the air bag 101, an inflator 107 for feeding gas so as to expand the air bag 101 therewith, and a bag holder 108 for holding the air bag 101, the pad 170 and the inflator 107, in a steering wheel.

The periphery of a lower circular opening 101a of the air bag 101 is retained by an annular retainer 111 made of a sheet of metallic material and integrated with a plurality of bolts 111a so that the air bag 101 is mounted on the bag holder 108 by tightening nuts 112 threadably fitted onto the bolts 111a each extending through the bag holder 108.

Since the bolts 111a, integrated with the retainer 111, also extend through a flange portion 107b of the inflator 107 so as allow them to be threadably tightened by the nuts 112, the inflator 107 is also held by the bag holder 108.

Figure 9:
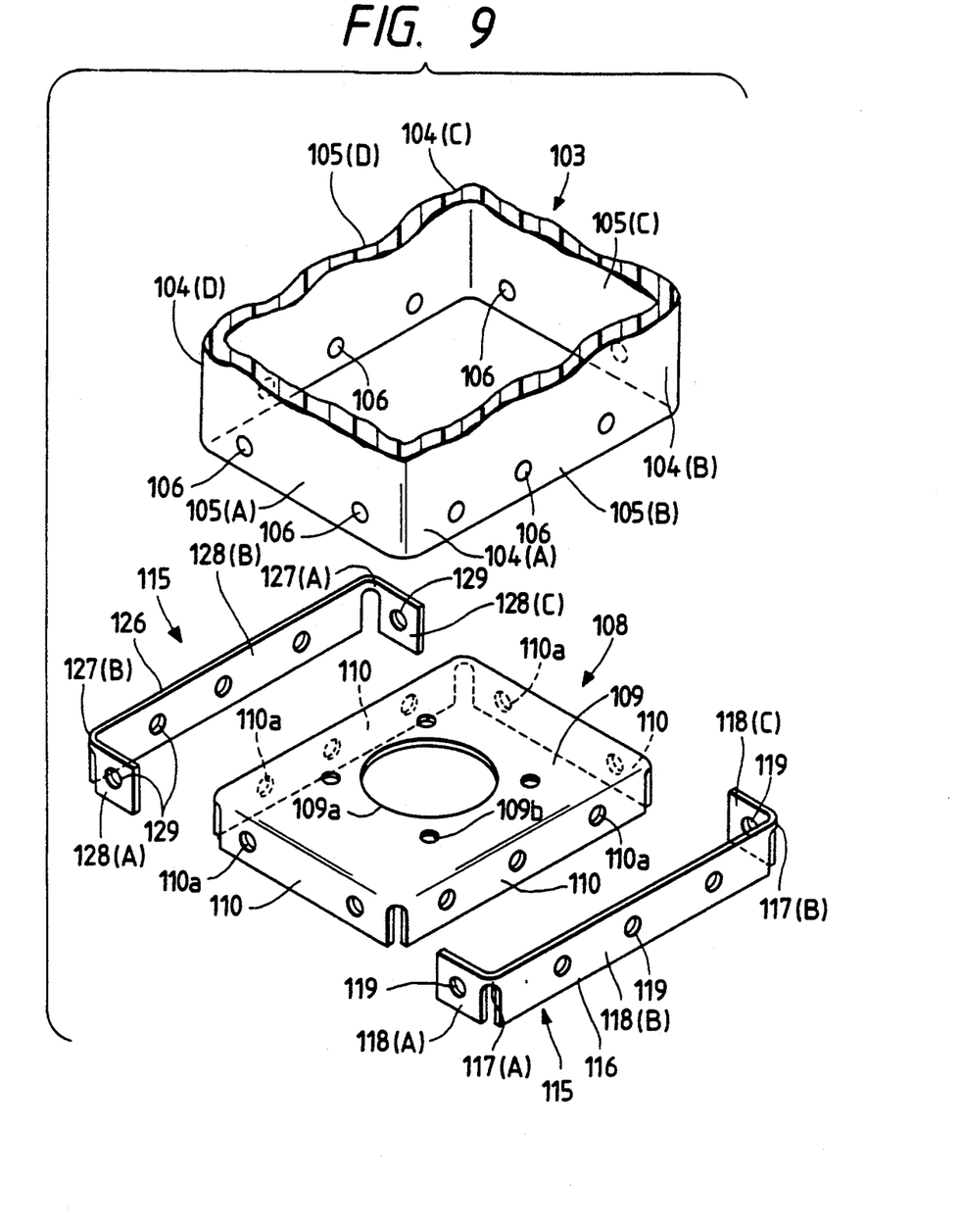
FIG. 9 is a perspective view of an air bag apparatus constructed according to the other embodiment of the present invention, particularly showing a pad securing member, a side wall of a bag holder and an abutment plate in the disassembled state.

The bag holder 108 is preferably made of a sheet of metallic material, and as shown in FIG. 6 and FIG. 9, it includes a rectangular bottom wall 109 and four side walls 110 each extending downwardly from the periphery of the bottom wall 109.

An insert hole 109a is formed at the central part of the bottom wall 109 so that the upper side of the inflator 107 having a plurality of outlet ports 107a formed thereon is inserted through the insert hole 109a. It should be added that fixing means such as nuts or the like (not shown) are arranged on the bottom wall 109 so as to allow the air bag apparatus M to be mounted on the steering wheel.

A plurality of through holes 110a are formed at predetermined positions on a side wall 110 so that the pad 170 is fixedly secured to the side wall 110 by means of rivets 113 inserted through the holes 110a.

As shown in FIG. 6 and FIG. 9, the pad 170 is molded of a synthetic resin, and the side portion 177 includes a square column-shaped securing member 103 made integral with the pad 170 around the lower part thereof. The pad securing member 103 includes four corner portions 104A, 104B, 104C, 104D and four flat plane portion 105A, 105B, 105C, 105D. A predetermined number of through-holes 106 are formed through walls 105A-105D so that rivets 113 may be inserted through the holes 106.

In the illustrated embodiment, an abutment plate 115 for fixing the pad securing member 103 to the side wall 110 of the bag holder 108 is composed of two segments 116 and 118, each preferably made of a sheet of metallic material as shown in FIG. 6 and FIG. 9.

The segments 116 and 126 are symmetrically designed in such a configuration that the outer periphery of the pad securing member 103 is covered with the segments 116 and 126 corresponding to two flat plane portions 105B and 105D.

The segment 116 includes two bent portions 117A, 117B corresponding to the corner portions 104A and 104B of the pad securing member 103 and three securing plane portions 118A, 118B, 118C extending from the bent portion 117A and 117B while corresponding respectively to the flat plane portions 105A, 105B and 105C having the corner portions 104A and 104B of the securing portion 103 located therebetween. In addition, through-holes 119 are formed on each of the securing plane portions 118A, 118B, and 118C so as to allow rivets 113 to be inserted through the holes 119.

On the other hand, the segment 126 includes two bent portions 127A, 127B corresponding to the corner portions 104C and 104D of the pad securing member 103 and three securing plane portions 128A, 128B, 128C extending from the bent portions 127A, 127B while corresponding to the flat plane portions 105A, 105D and 105C having the corner portions 104C and 104D located therebetween. In addition, through holes 129 are formed on each of the securing plane portions 128C, 128B and 128A so as to allow rivets 113 to be inserted through the holes 129.

The segments 116 and 126 are arranged on the outer peripheral surface of the pad securing member 103 of the pad 170 such that the inner wall surfaces of the segments 116 and 126 are located opposite to the outer wall surfaces of the side wall 110 of the bag holder 108. While the rivets 113 are inserted through the holes 119, 129, 106 and 110a and then tightened, the securing member 103 of the pad 170 is clamped between the abutment plate 115 (composed of the segments 116, 126) and the side wall 116 of the bag holder 108 so that it is fixedly secured to the side wall 110 of the bag holder 108.

When the air bag apparatus M is assembled with the aforementioned components, the air bag 101 is folded in the flattened, deflated state while the retainer 111 is placed around the inner periphery of the opening portion 101a of the air bag 101, and subsequently, the air bag 101 and the inflator 107 are secured to the bag holder 108 with the aid of the bolts 111a integrated with the retainer 111. Thereafter, the pad 170 is secured to the bag holder 108 with the aid of the abutment plate 115 (composed of the segments 116, 126) and the rivets 113. At this time, the assembling operation is completed.

With the air bag apparatus M constructed in the above-described manner, the abutment plate 115 is composed of two segments 116 and 126 in such a manner that the square column-shaped pad securing member 103 is divided into two parts corresponding to the flat plane portions 105A and 105C. The segments 116 and 126 include bent portions 117A, 117B and 127A, 127B corresponding to two corner portions 104D, 104C of the securing portion 103 and three securing plane portions 118A-118C and 128A-128C corresponding to the flat plane portion 105 with the corner portions 104A-104D of the pad securing member 103 located therebetween. In addition, holes 119 and 129 are formed through the securing plane portions 118 and 128 so as to allow the rivets 113 to be inserted therethrough.

With this construction, when the securing member 103 of the pad 170 is clamped between the abutment plates 115 (composed of the segments 116, 126) and the side wall 110 of the bag holder 108 so that it is fixedly secured to the side wall 110 by inserting the rivets 113 through the holes 119 and 129 on the securing plane portions of the segments 116 and 126, the bent portions 117A, 117B and 127A, 127B of the segments 116 and 126 are supported at the four corner portions of the pad securing member 103 while the securing plane portions on the opposite ends of the segments 116 and 126 are brought in contact with the flat plane portions of the pad securing member 103.

Thus, the respective corner portions of the pad securing member 103 are reinforced with the segments 116 and 126 which have been brought in contact therewith, resulting in improved strength of each corner portion 104A–104D of the pad securing member 103.

With the air bag apparatus M constructed according to the embodiment of the present invention, since holes 106 in the pad securing member 103 are correctly aligned with the holes 119 and 129 on the securing plane portions 118A–118C and 128A–128C by bringing the bent portions 117A, 117B and 127A, 127B of the segments 116 and 126 in contact with the corner portions of the pad securing member 103, an efficiency of the assembling operation to be performed using the rivets 113 can be improved.

In addition, with the air bag apparatus M constructed according to the other embodiment of the present invention, since the abutment plate 115 is composed of two components 116 and 126, the number of components constituting the air bag apparatus M can be reduced compared with the conventional air bag apparatus which requires four abutment plates corresponding to respective flat plane portions 105A–105D.

In the illustrated embodiment, the securing member 103 of the pad 170 is designed in the square column-shaped configuration but the present invention should not be limited only to this configuration. Alternatively, it may be designed in another polygonal column-shaped configuration corresponding to the configuration of the side wall of the bag holder. For example, a triangular column-shaped pad securing member may be provided. The securing member includes an abutment plate 145 composed of two segments 146 and 156 including bent portions 147 and 157 and securing plane portions 148 and 158 having through holes 149 and 159 formed therein so as to allow a pad securing member to be clamped therebetween, while corresponding to three side walls 140 of a bag holder 138, having a triangular bottom wall 139, as shown in FIG. 10.

In the illustrated embodiment, segments 116 and 126 including bent portions 117A, 117B and 127A, 127B are employed as segments. Alternatively, for example, an abutment plate may be composed of segments which coincide with that of corner portions of a pad securing member. For example, as shown in FIG. 10, an abutment plate may be composed of three segments 146 and 166 which coincide with that of the corner portions of the pad securing member.

Figure 10:
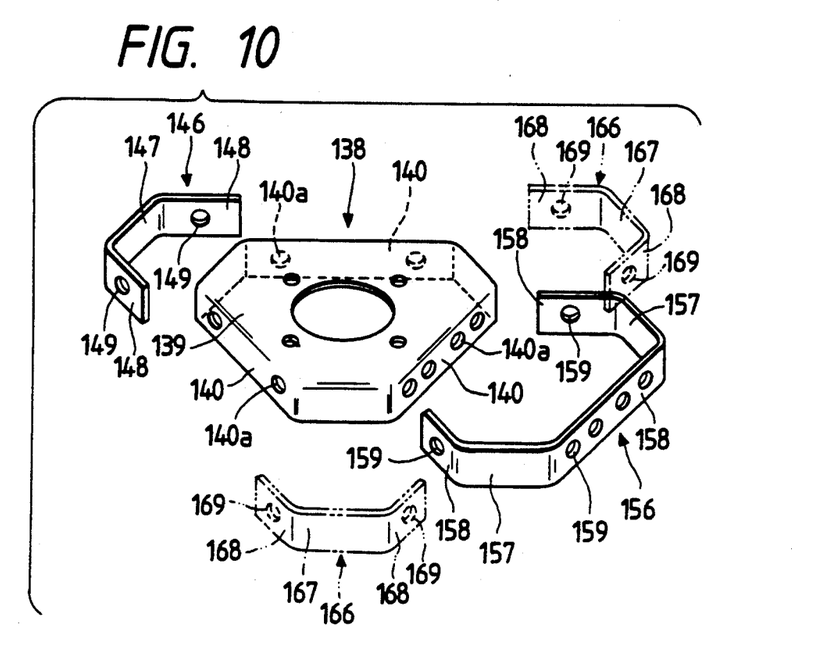
FIG. 10 is a perspective view of an air bag apparatus constructed according to a modification of the other embodiment of the present invention, particularly showing a bag holder and segments in the disassembled state.

In FIG. 10, reference numeral 167 designates a bent portion, reference numeral 168 designates a securing plane portion, and reference numeral 169 designates a through-hole.

In the illustrated embodiment, rivets 113 are employed as fixing means for fixedly securing the securing member 103 of the pad 170. Alternatively, a combination of bolts and nuts may be employed in place of the rivets 113.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. An air bag apparatus comprising:
   a bag holder;
   an air bag disposed in a deflated condition on said bag holder;
   a pad member including an upper wall portion surrounding a periphery of the air bag and side wall portions extending downward from a periphery of said upper wall portion and coupled to said bag holder, said upper wall portion including cover portions adapted to be opened upon breakage of a breakage portion of the upper wall portion when the air bag is inflated and expanded; and
   a plurality of vertically extending plate-shaped ribs integrally formed with said upper wall portion and said side wall portions along a periphery of said breakage portion, said ribs extending from said side wall portions to said breakage portion below a lower surface of said upper wall portion.

2. An air bag apparatus according to claim 1, wherein an oblique side of each of said vertically extending plate-shaped ribs is in the form of a concave arch.

3. An air bag apparatus according to claim 1, wherein said breakage portion is composed of a center line portion and side line portions, said side line portions extending from opposite ends of said center line portion, said cover portions being defined by a part of said pad member which includes said center line portion and said side line portions.

4. An air bag apparatus according to claim 1, wherein said bag holder including side walls, said side wall portions being coupled to said side walls of the bag holder.

5. An air bag apparatus according to claim 4, wherein said bag holder and said side wall portions each include bores therethrough, fastening members being inserted into said bores so as to couple said bag holder to said side wall portions.

6. An air bag apparatus according to claim 5, wherein said bag holder includes abutment plate structure having a plurality of pawl portions at a lower end thereof, a plurality of recesses being formed in a lower end of said side wall portions, said pawl portions being engageable with said recesses so as to couple said bag holder to said side wall portions.

7. An air bag apparatus according to claim 1, wherein said side wall portions have a hollow column-shaped configuration, said bag holder including an abutment plate structure having a plurality of segments which are configured so as to surround at least a portion of an outer periphery of said column-shaped side wall portions, said bag holder including a plate member sized to be disposed within at least a portion of an inner periphery of said column-shaped wall portions, said side wall portions being clamped between the abutment plate structure and the plate member.

8. An air bag apparatus according to claim 7, wherein said segments include at least one bent portion corresponding to a corner portion of said side wall portions and at least two securing plane portions corresponding to two flat plane portions of said side wall portions, said corner portion being disposed between adjacent securing plane portions, each of said securing plane portions including a plurality of bores defined therethrough, said side wall portions including corresponding bores, fastening members being inserted in said bores to couple the side wall portions to the bag holder.

9. The air bag apparatus according to claim 1, wherein said pad member is made of a synthetic resin.

10. The air bag apparatus according to claim 9, wherein said synthetic resin is a thermoplastic elastomer having a bending elastic modulus in the range of 50 to 3200 kgf/cm$^2$.

* * * * *